United States Patent
Park et al.

(10) Patent No.: US 7,640,134 B2
(45) Date of Patent: Dec. 29, 2009

(54) APPARATUS AND METHOD FOR DETECTING STEP IN A PERSONAL NAVIGATOR

(75) Inventors: Kyong-Ha Park, Suwon-si (KR); Hyun-Su Hong, Seongnam-si (KR); Jae-Myeon Lee, Suwon-si (KR); Chan-Gook Park, Seoul (KR); Jin-Won Kim, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 631 days.

(21) Appl. No.: 11/523,458

(22) Filed: Sep. 18, 2006

(65) Prior Publication Data

US 2007/0067094 A1   Mar. 22, 2007

(30) Foreign Application Priority Data

Sep. 16, 2005   (KR) .................. 10-2005-0087110

(51) Int. Cl.
*G01C 22/00* (2006.01)
*G01P 15/18* (2006.01)
*A61B 5/103* (2006.01)
*A61B 5/11* (2006.01)

(52) U.S. Cl. .............. 702/141; 600/595; 600/592; 600/587; 73/865.4; 73/491

(58) Field of Classification Search ............ 702/160; 600/587, 592, 595; 73/865.4, 491
See application file for complete search history.

(56) References Cited

U.S. PATENT DOCUMENTS

| | | | | |
|---|---|---|---|---|
| 5,500,635 A * | 3/1996 | Mott | | 340/323 R |
| 5,976,083 A * | 11/1999 | Richardson et al. | | 600/300 |
| 6,135,951 A * | 10/2000 | Richardson et al. | | 600/300 |
| 6,826,477 B2 * | 11/2004 | Ladetto et al. | | 701/217 |
| 6,889,146 B2 * | 5/2005 | Sullivan et al. | | 702/43 |
| 7,305,323 B2 * | 12/2007 | Skvortsov et al. | | 702/160 |
| 2002/0038178 A1 * | 3/2002 | Talkenberg et al. | | 701/200 |
| 2003/0018430 A1 * | 1/2003 | Ladetto et al. | | 701/217 |
| 2004/0064286 A1 * | 4/2004 | Levi et al. | | 702/141 |
| 2006/0184320 A1 * | 8/2006 | Hong | | 701/209 |
| 2007/0118326 A1 * | 5/2007 | Starodubtsev et al. | | 702/141 |

FOREIGN PATENT DOCUMENTS

EP   1 253 404   10/2002

\* cited by examiner

*Primary Examiner*—Eric Bolda
*Assistant Examiner*—Ari M Diacou
(74) *Attorney, Agent, or Firm*—The Farrell Law Firm, LLP

(57) ABSTRACT

A step detecting apparatus and method in a personal navigator where acceleration signals in at least two directions are acquired from an accelerometer sensor, as a pedestrian moves. Variances of the acceleration signals are calculated and summed. The variance sum is compared with a threshold. If the variance sum is greater than the threshold, it is determined that a detected step is a walking step. If the variance sum is less than the threshold, it is determined that the detected step is a mark-time step.

11 Claims, 8 Drawing Sheets

APPARATUS AND METHOD FOR DETECTING STEP IN A PERSONAL NAVIGATOR

PRIORITY

This application claims priority under 35 U.S.C. § 119 to an application filed in the Korean Intellectual Property Office Sep. 16, 2005 and assigned Serial No. 2005-87110, the contents of which are incorporated herein by reference.

BACKGROUND OF THE INVENTION

1. Field of the Invention

The present invention relates generally to a personal navigator, and in particular, to a step detecting apparatus and method in a personal navigator.

2. Description of the Related Art

Personal navigation aims at human-oriented route guidance. It locates a pedestrian and provides route guidance to him or her.

A personal navigator estimates a step length based on Global Positioning System (GPS) information and step information of a pedestrian and creates a navigation solution using the step length estimate, thereby providing the navigation service. Under an environment other than an open sky environment, i.e. under an environment where GPS signals are not available, such as indoors or within the center of cities, a navigation solution is estimated based on GPS information and pedestrian step information used before current accurate GPS information, and the navigation service is provided using the navigation solution estimate. Therefore, the accuracy of pedestrian step information is critical to providing accurate navigation service in a personal navigator.

Typically, the pedestrian step information is detected from an output pattern of an accelerometer sensor and the personal navigator estimates a step length based on the step detection result. Then the personal navigator calculates a navigation solution based on the step length.

Conventionally, a determination is made as to whether the pedestrian is walking just from the output pattern of the accelerometer sensor. Hence, if the pedestrian takes mark-time steps, it will be incorrectly sensed as normal walking. In the case where mark-time steps are mixed with walking steps during a walk, the step detection result is used as if it were derived all from normal walking.

In this case, an estimated step length will not be correct. A navigation solution calculated using this step length will also not be correct.

SUMMARY OF THE INVENTION

An object of the present invention is to substantially solve at least the above problems and/or disadvantages and to provide at least the advantages below. Accordingly, an object of the present invention is to provide a step detecting apparatus and method for enabling correct detection of pedestrian steps and thus enabling a correct estimation of a step length in a personal navigator.

Another object of the present invention is to provide a step detecting apparatus and method for distinguishing mark-time steps from walking steps in a personal navigator.

A further object of the present invention is to provide a step detecting apparatus and method for correctly counting in a personal navigator the number of mark-time steps and the number of walking steps that a pedestrian takes.

According to one aspect of the present invention, in a step detecting apparatus in a personal navigator, an accelerometer sensor outputs acceleration signals with respect to at least two directions, as a pedestrian moves. A step detector calculates variances of acceleration signals in the at least two directions received from the accelerometer sensor, sums the variances, compares the variance sum with a threshold, and determines whether a detected step is a mark-time step or a walking step according to the comparison.

According to another aspect of the present invention, in a step detecting method in a personal navigator, acceleration signals in at least two directions are acquired from an accelerometer sensor, as a pedestrian moves. Variances of the acceleration signals are calculated and summed. The variance sum is compared with a threshold. If the variance sum is greater than the threshold, it is determined that a detected step is a walking step. If the variance sum is less than the threshold, it is determined that the detected step is a mark-time step.

According to a further aspect of the present invention, in a step detecting method in a personal navigator, a walking step count, a mark-time step, and a step detection count are set to initial values. Acceleration signals in at least two directions are acquired from an accelerometer sensor, as a pedestrian moves, and it is determined whether a step is detected. Upon detection of a step, the step detection count is increased by one and variances of the acceleration signals are calculated and summed. If the variance sum is greater than the threshold, the walking step count is increased by one and if the variance sum is less than the threshold, the mark-time step count is increased by one. Walking steps, mark-time steps, and step detections are counted by repeating the above process.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
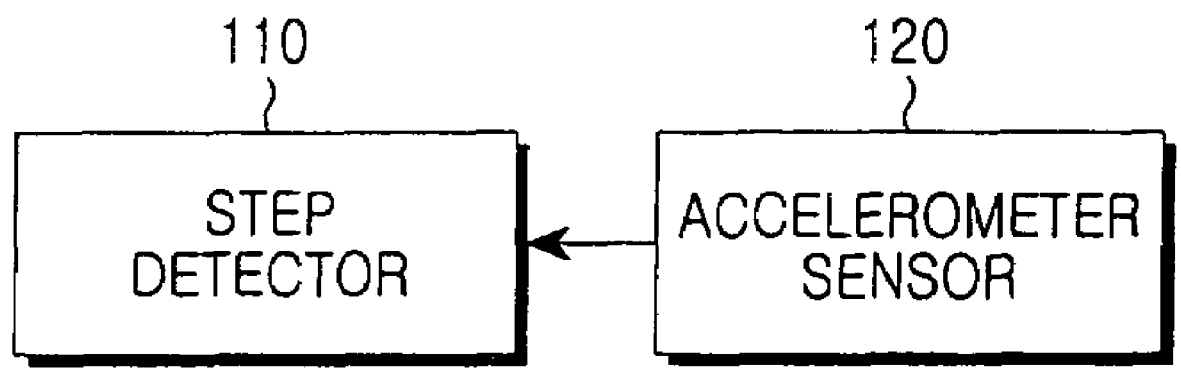
FIG. 1 is a block diagram of a step detection apparatus in a personal navigator according to the present invention.

FIG. 1 is a block diagram of a step detection apparatus in a personal navigator according to the present invention. The step detection apparatus includes an accelerometer sensor 110 and a step detector 120.

The accelerometer sensor 110 may be a multi-axis accelerometer sensor, such as a two-axis accelerometer sensor or the like. The accelerometer sensor 110 senses a linear movement along each axis and outputs an acceleration signal waveform according to the sensed movement. For example, the accelerometer sensor 110 can be a three-axis Micro Electro Mechanical System (MEMS) type, i.e. an ultra-small accelerometer, for detecting a linear movement along each of a side direction (X), a forward direction (Y), and a downward direction (Z) and outputs an acceleration signal based on the detection result in the present invention.

The step detector 120 can be configured as a microcontroller. It acquires X, Y and Z-direction acceleration signals from the accelerometer sensor 110 and determines whether steps are detected. Upon the detection of a step, the step detector 120 calculates the variances of two-directional acceleration signals at the time when the step was detected, sums the variances, and determines whether the step is a mark-time step or a normal walking step by comparing the sum with a threshold. Based on the determination result, the step detector 120 counts mark-time steps and-walking steps.

As described above, the step detecting apparatus for a personal navigator separately detects mark-time steps and walking steps, and estimates an accurate step length. Therefore, the detecting apparatus can provide navigation service with high reliability.

Figure 2:
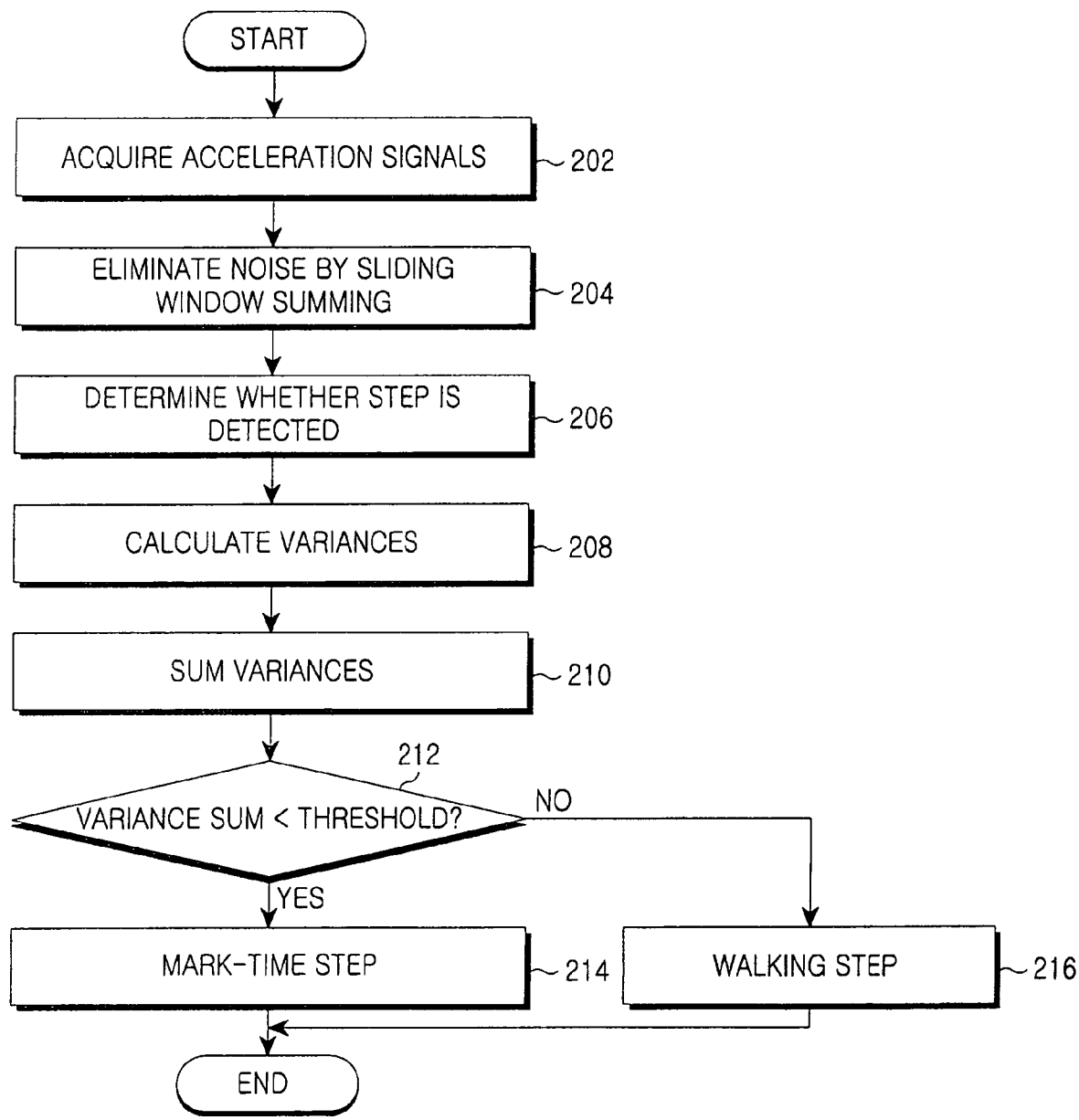
FIG. 2 is a flowchart illustrating a step detection method in the personal navigator according to the present invention.

FIG. 2 is a flowchart illustrating a step detection method in the personal navigator according to the present invention.

Referring to FIG. 2, the step detector 120 receives an acceleration signal of each direction from the accelerometer sensor 110 in step 202.

Figure 3:
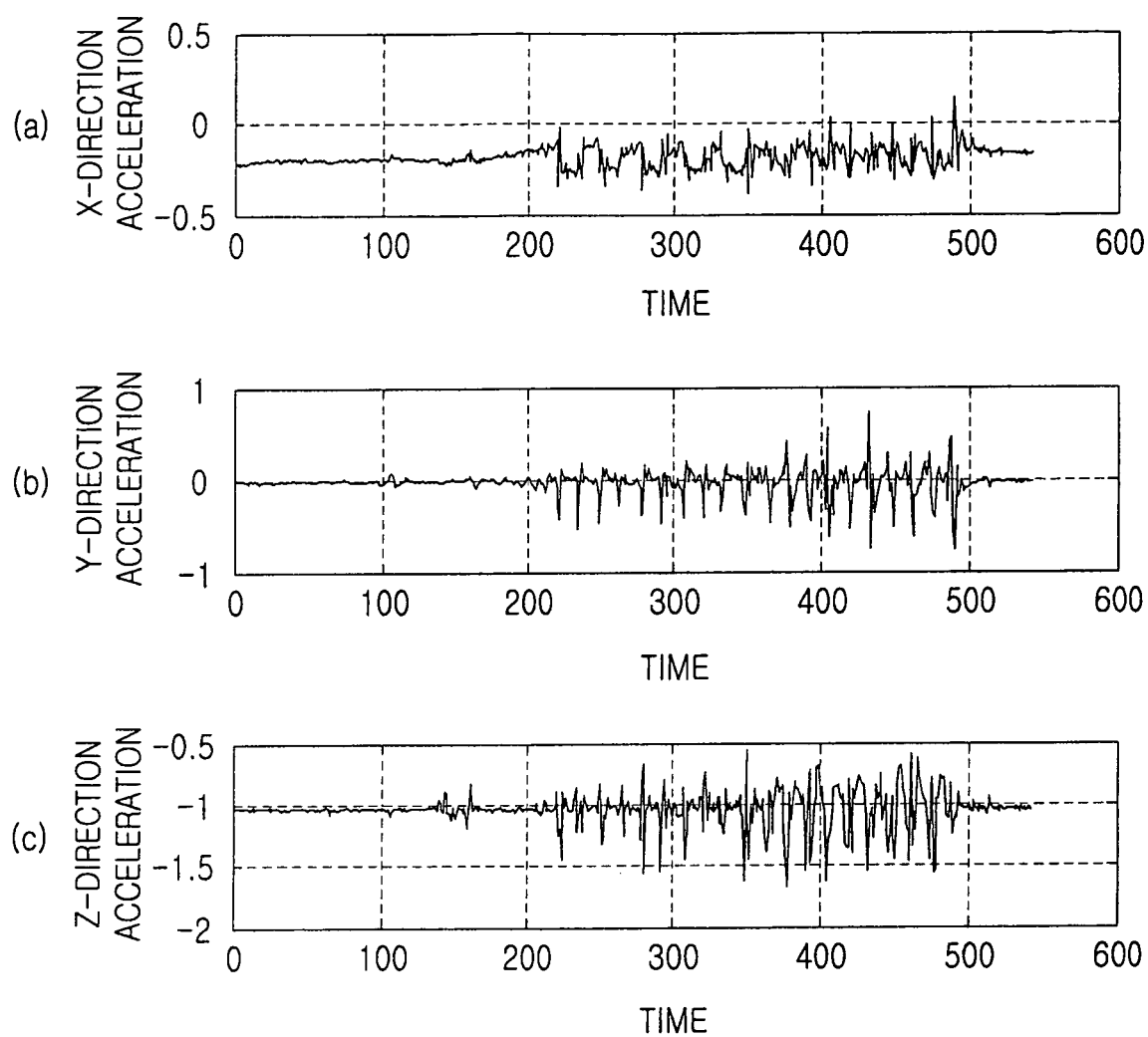
FIG. 3 shows graphs illustrating acceleration signals output from an accelerometer in the personal navigator according to the present invention.

For example, if a pedestrian takes 10 mark-time steps and 10 walking steps, the accelerometer sensor 110 outputs acceleration signals as illustrated in FIG. 3.

FIG. 3 shows diagrams illustrating X-, Y- and Z-direction acceleration signals. The vertical axis represents acceleration and the horizontal axis represents time in each diagram.

Referring to diagram (a) of FIG. 3, the acceleration signal waveform changes little with respect to walk. Referring to diagrams (b) and (c) of FIG. 3, the acceleration signal waveforms change more than that illustrated in diagram (a) of FIG. 3. Thus it can be concluded that walk affects the Y- and Z-direction acceleration signals more than the X-direction acceleration signal.

Therefore, the step detector 120 preferably carries out step detection using the Y- and Z-direction acceleration signals.

Then the step detector 120 eliminates noise from the acceleration signals by sliding window summing in step 204. The sliding window summing is a signal processing technique in which the acceleration values within a window of a predetermined size are summed, moving the window along the time axis.

Figure 4:
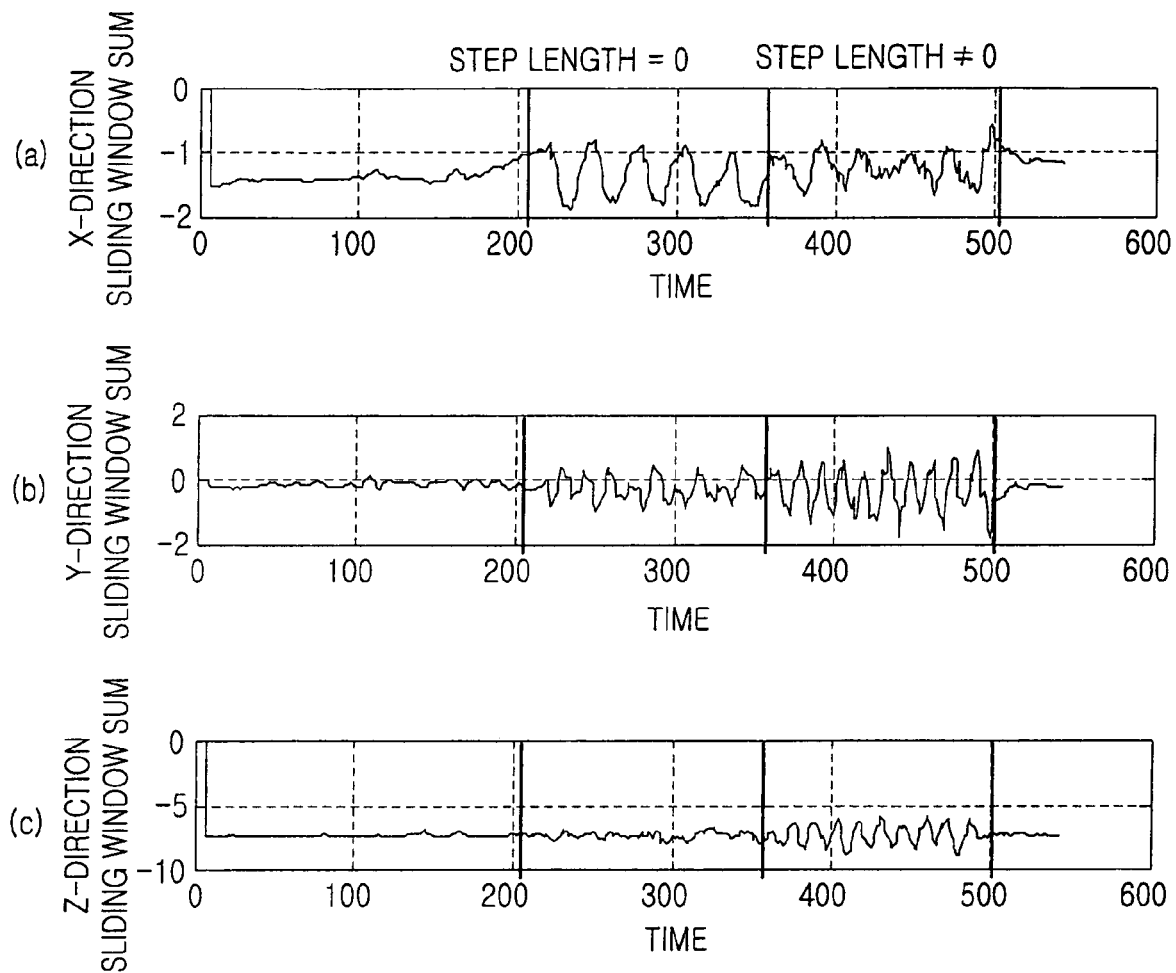
FIG. 4 shows graphs illustrating acceleration signal waveforms from which noise has been eliminated by sliding window summing according to the present invention.

Diagrams (a), (b) and (c) of FIG. 4 illustrate sliding window sums for the X-, Y- and Z-direction acceleration signal waveforms, respectively. In the diagrams, the vertical axis represents acceleration and the horizontal axis represents time.

Referring to the diagrams of FIG. 4, compared to the acceleration signal waveform diagrams illustrated in FIG. 3, the sliding window summing technique eliminates noise from the signals.

After the noise elimination from the acceleration signals, the step detector 120 determines whether a step has been detected by analyzing a noise-free acceleration signal pattern in step 206. The determination can be made by a general step detection technique such as zero crossing detection.

Upon detection of a step, the step detector 120 calculates the variance of the sliding window sum for each acceleration signal in step 208.

Figure 5:
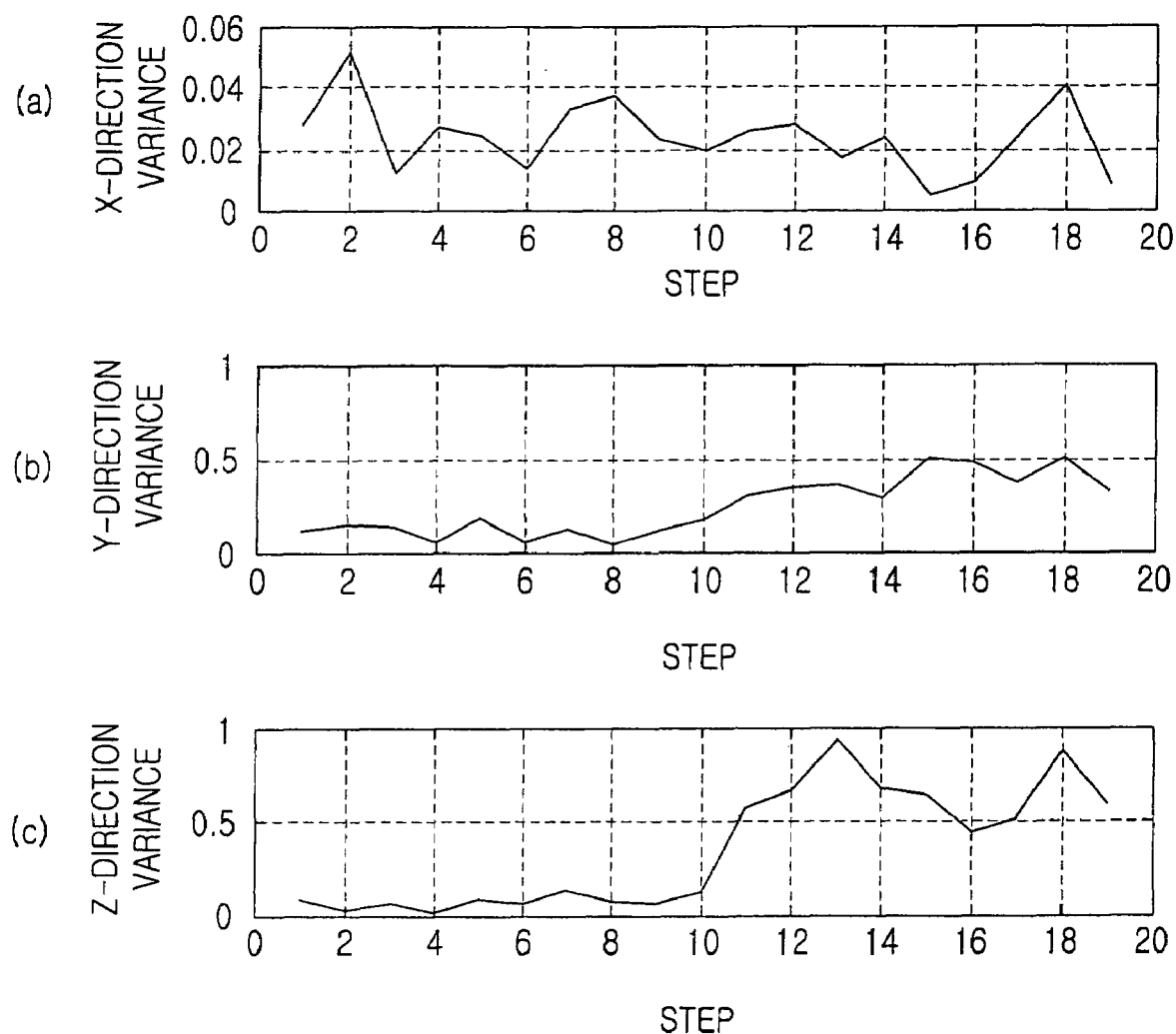
FIG. 5 shows graphs illustrating the variance waveforms of acceleration signals in respective directions according to the present invention.

The variances of the acceleration signals are shown in diagrams in FIG. 5. The diagrams of FIG. 5 illustrate signal waveforms of the variances of the sliding window sums for the X-, Y- and Z-direction acceleration signals, respectively. In the diagrams, the vertical axis represents variance and the horizontal axis represents the number of steps.

Referring to diagram (a) of FIG. 5, there is little change in the variance of the sliding window sum for the X-direction acceleration signal with respect to 10 mark-time steps and 10 walking steps.

Referring to diagrams (b) and (c) of FIG. 5, the variances of the sliding window sums for the Y- and Z-direction signals experience a greater change and are higher in the 10 walking steps than in the 10 mark-time steps.

Therefore, it is preferable that the step detector 120 uses the variances of the sliding window sums for the Y- and Z-direction acceleration signals having a broad different between mark-time steps and walking steps.

Hence, the step detector 120 sums the variances of the sliding window sums for the Y- and Z-direction acceleration signals in step 208. Thus, the difference between the mark-time steps and the walking steps becomes more apparent.

Figure 6:
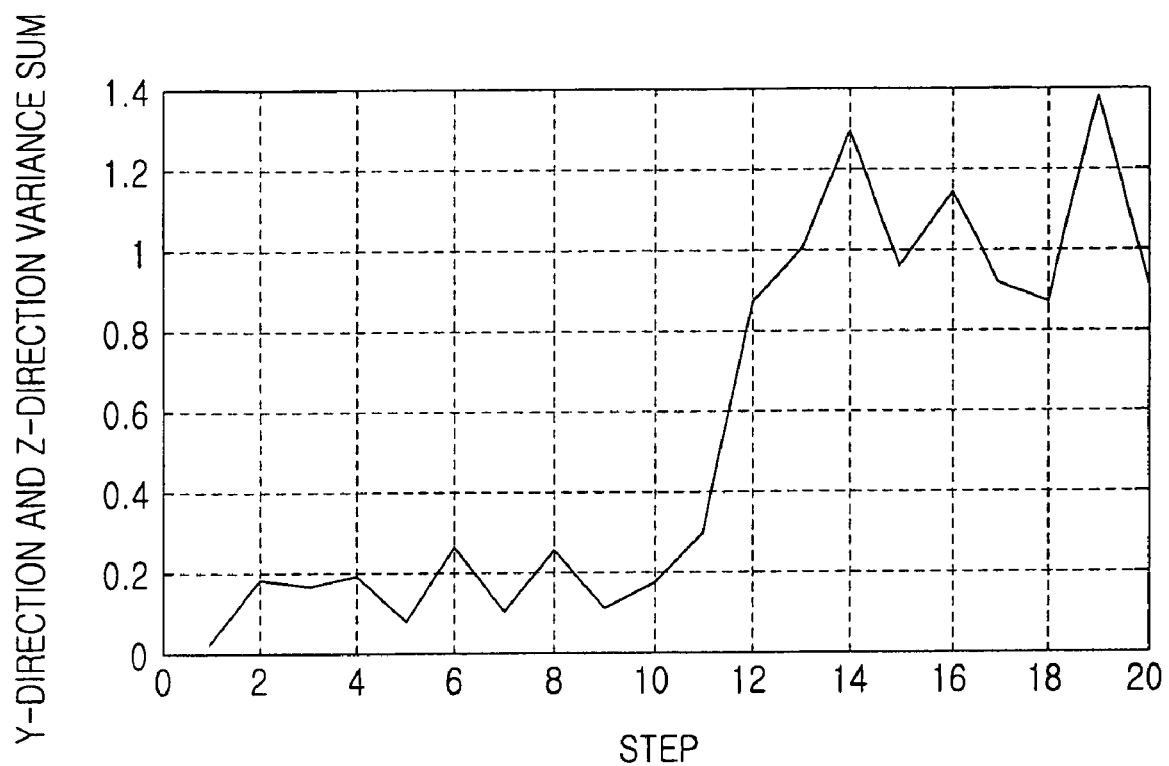
FIG. 6 is a graph illustrating the sum of the variances of the acceleration signals in the directions according to the present invention.

The sum of the variances of the sliding window sums for the Y- and Z-direction acceleration signals is illustrated in FIG. 6. Referring to FIG. 6,. the difference between the mark-time steps 0 to 10 and the walking steps 10 to 20 after the summation is more apparent than that in each variance signal waveform before the summation.

In step 212, the step detector 120 compares the sum of the variances with a threshold. The threshold can be set empirically.

If the variance sum is less than the threshold,. the, step detector 120 determines that a mark-time step has been taken in step 214. If the variance sum is greater than the threshold, the step detector 120 determines that a walking step has been taken in step 216.

Figure 7:
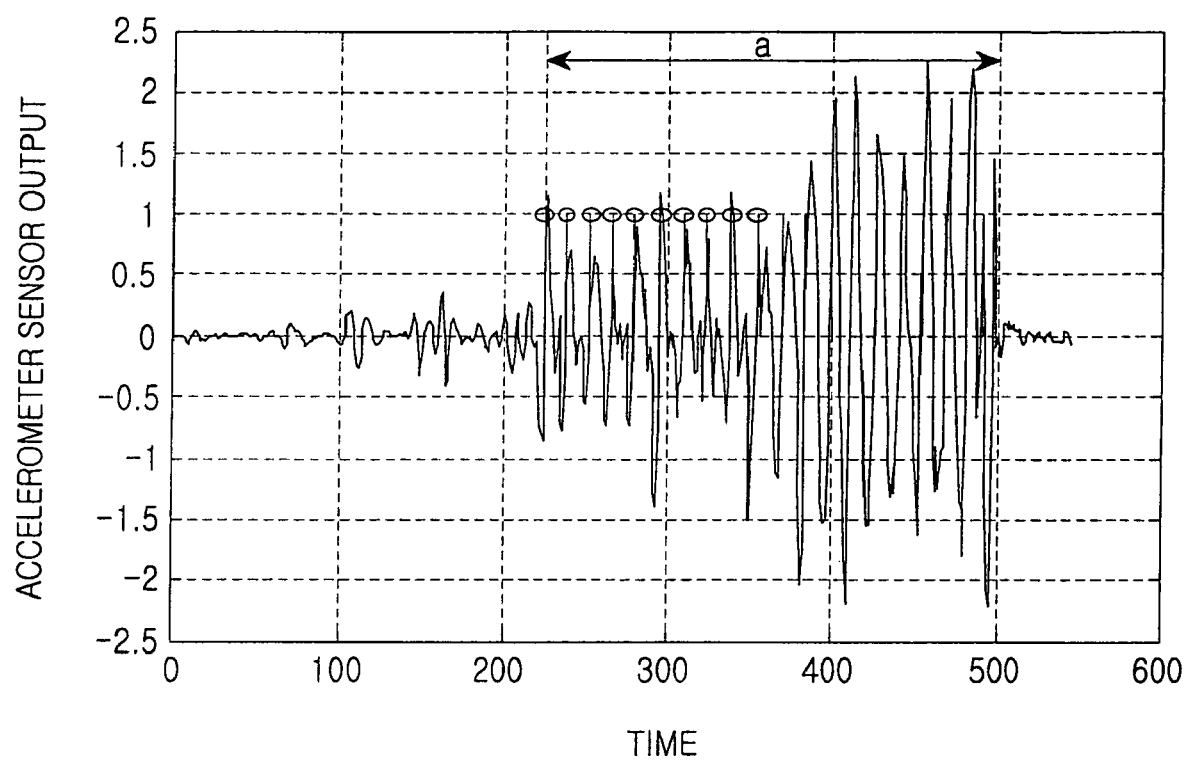
FIG. 7 is a graph illustrating a step detection result according to the present invention.

FIG. 7 is a graph illustrating X-, Y- and Z-direction acceleration signal waveforms output from the accelerometer sensor 110, from which mark-time steps are detected. Referring to FIG. 7, a total step detection period is denoted by reference character a. For a period with circles within the period a, mark-time steps have been taken. The graph reveals that 10 mark-time steps are accurately detected.

While mark-time steps and walking steps are described above as being distinguishably detected at a step detection point, the mark-time steps and walking steps can alternatively be counted in addition to the separate detection.

Figure 8:
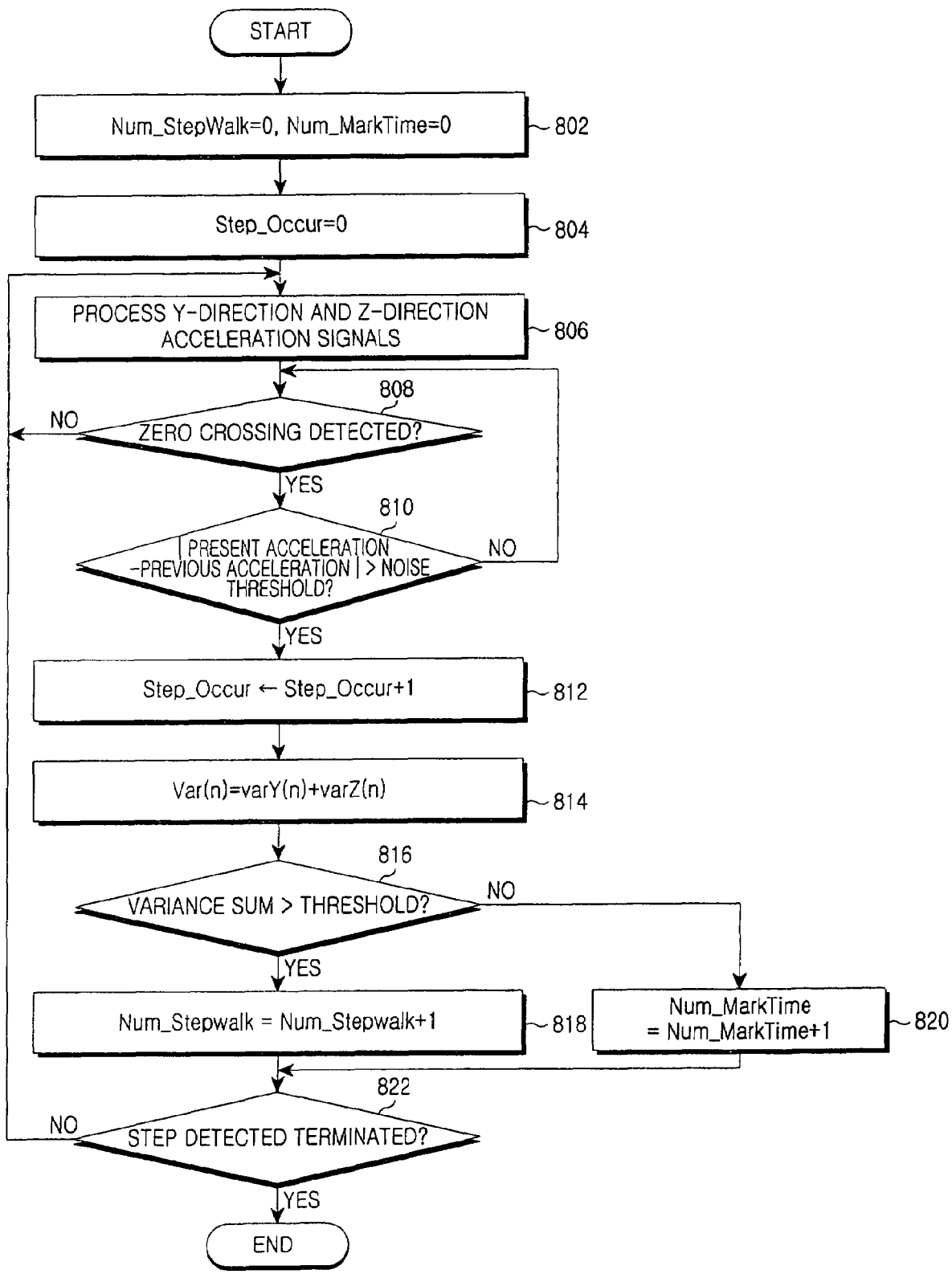
FIG. 8 is a flowchart illustrating a step detection method in the personal navigator according to the present invention.

FIG. 8 is a flowchart illustrating a step detection method in the personal navigator according to the present invention. Referring to FIG. 8, when step detection starts, the step detector 120 sets a walking step count Num_StepWalk and a mark-time step count Num_MarkTime to initial values '0' in step 802 and sets a step detection count Step_Occur to an initial value '0' in step 804.

In step 806, the step detector 120 processes acceleration signals received from the accelerometer sensor 110. The step detector 120 eliminates noise by sliding window summing of the acceleration signals.

The step detector 120 detects a zero crossing of the acceleration signals, that is, detects points where the acceleration signals pass through zero in step 808.

If a zero crossing is not detected, the step detector 120 returns to step 806. Upon detection of a zero crossing, the step detector 120 compares the difference between a current acceleration and a previous acceleration with a noise threshold in step 810.

If the difference is less than the noise threshold, the step detector 120 returns to step 808, determining that no step has been taken. If the difference is greater than the noise threshold, the step detector 120 increases Step_Occur by 1, determining that a pedestrian has taken a step in step 812.

In step 814, the step detector 120 calculates the variances varY(n) and varZ(n) of the sliding window sums of Y- and Z-direction acceleration signals and sums the variances (Var (n)=varY(n)+varZ(n)).

The step detector 120 compares the variance sum with a threshold by which a mark-time step is distinguished form a walking step in step 816.

If the variance sum is greater than the threshold, the step detector 120 increases Num_StepWalk by 1, determining that the detected step is a walking step in step 818.

If the variance sum is less than the threshold, the step detector 120 increases Num_MarkTime by 1, determining that the detected step is a mark-time step in step 820.

In step 822, the step detector 120 determines whether a request for terminating the step detection has been received. In the absence of a termination request, the step detector continues to count step detections, walking steps, and mark-time steps in steps 806 to 820 until termination of the step detection is requested.

As described above, the present invention advantageously enables accurate estimation of a step length by distinguishing mark-time steps from walking steps. Hence, a high-reliability navigation service can be provided.

Furthermore, mark-time steps and walking steps can be accurately counted.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A step detecting apparatus in a personal navigator, comprising:
    an accelerometer sensor for outputting acceleration signals with respect to at least two directions; and
    a step detector configured to calculate variances of acceleration signals in the at least two directions received from the accelerometer sensor, summing the variances, comparing the variance sum with a threshold, and determining whether a detected step is a mark-time step or a walking step according to the comparison,
    wherein two of the at least two directions are a forward direction and a downward direction from the pedestrian.

2. The step detecting apparatus of claim 1, wherein the step detector counts mark-time steps and walking steps according to the determination.

3. The step detecting apparatus of claim 1, wherein the accelerometer sensor is an at least two-axis accelerometer sensor.

4. The step detecting apparatus of claim 1, wherein the threshold is a value for distinguishing a mark-time step and a walking step.

5. The step detecting apparatus of claim 1, wherein the step detector eliminates noise from the acceleration signals by sliding window summing.

6. A step detecting method in a personal navigator, comprising the steps of:
    acquiring acceleration signals in at least two directions from an accelerometer sensor;
    calculating variances of the acceleration signals and summing the variances;
    comparing the variance sum with a threshold;
    determining that a detected step is a walking step if the variance sum is greater than the threshold;
    determining that the detected step is a mark-time step if the variance sum is less than the threshold; and
    storing the determined walking step and/or mark-time step in the personal navigator,
    wherein two of the at least two directions are a forward direction and a downward direction from the pedestrian.

7. The step detecting method of claim 6, further comprising counting mark-time steps and walking steps according to the determination.

8. The step detecting method of claim 6, wherein the threshold is a value for distinguishing a mark-time step and a walking step.

9. The step detecting method of claim 6, further comprising eliminating noise from the acceleration signals by sliding window summing.

10. A step detecting method in a personal navigator, comprising the steps of:
    (a) setting a walking step count, a mark-time step, and a step detection count to initial values;
    (b) acquiring acceleration signals in at least two directions from an accelerometer sensor, and determining whether a step is detected;
    (c) increasing the step detection count by one, upon detection of a step, calculating variances of the acceleration signals, and summing the variances;
    (d) increasing the walking step count by one if the variance sum is greater than the threshold and increasing the mark-time step count by one if the variance sum is less than the threshold;
    (e) counting walking steps, mark-time steps, and step detections by repeating steps (b)-(d), and
    (f) storing the counted walking steps, mark-time steps and step detections in the personal navigator,
    wherein two of the at least two directions are a forward direction and a downward direction from the pedestrian.

11. The step detecting method of claim 10, wherein the threshold is a value for distinguishing a mark-time step and a walking step.

* * * * *

UNITED STATES PATENT AND TRADEMARK OFFICE
CERTIFICATE OF CORRECTION

PATENT NO. : 7,640,134 B2  Page 1 of 1
APPLICATION NO. : 11/523458
DATED : December 29, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this

Ninth Day of November, 2010

David J. Kappos
*Director of the United States Patent and Trademark Office*